United States Patent [19]

Okamoto et al.

[11] Patent Number: 5,541,901
[45] Date of Patent: Jul. 30, 1996

[54] DISK REPRODUCING APPARATUS HAVING A CIRCUIT FOR DETECTING AN ABNORMALITY OF A SERVO DEVICE

[75] Inventors: Naruhiro Okamoto, Kyoto; Hiroyuki Watanabe, Ooizumi-machi, both of Japan

[73] Assignee: Rohm Co., Ltd., Kyoto, Japan

[21] Appl. No.: 491,031

[22] Filed: Jun. 16, 1995

[30] Foreign Application Priority Data

Jun. 17, 1994 [JP] Japan .................................. 6-135569

[51] Int. Cl.$^6$ ............................................ G11B 7/00
[52] U.S. Cl. ........................ 369/44.32; 369/60; 369/54; 369/47
[58] Field of Search .................................. 369/44.28, 47, 369/48, 54, 59, 32, 58, 44.32, 60, 50

[56] References Cited

U.S. PATENT DOCUMENTS

| | | | |
|---|---|---|---|
| 5,224,087 | 6/1993 | Maeda et al. | 369/54 |
| 5,291,467 | 3/1994 | Ishiwata et al. | 369/54 X |
| 5,331,616 | 7/1994 | Morita et al. | 369/44.32 |
| 5,351,227 | 9/1994 | Ichikawa et al. | 369/58 |

*Primary Examiner*—Aristotelis Psitos
*Assistant Examiner*—Thang V. Tran
*Attorney, Agent, or Firm*—Nikaido, Marmelstein, Murray & Oram LLP

[57] ABSTRACT

A signal read out from a disk by a pickup is written in a RAM. The signal written in the RAM is read out at a speed lower than the writing speed to perform a reproduction operation. When there is an abnormality of the servo, the writing to the RAM is stopped and the servo is returned to a predetermined operation point to perform a re-try. After the occurrence of the abnormality of the servo, whether a return data and a data on a position just in front of a position where the servo abnormality occurs coincide with each other or not is determined. When the data coincide with each other, data on the position where the abnormality occurs and positions subsequent thereto are written in the RAM. When the data do not coincide with each other, the servo repeats the re-try for a predetermined period of time.

10 Claims, 3 Drawing Sheets

DISK REPRODUCING APPARATUS HAVING A CIRCUIT FOR DETECTING AN ABNORMALITY OF A SERVO DEVICE

BACKGROUND OF THE INVENTION

1. Field of the Invention

The present invention relates to a disk reproducing apparatus which reads out information from a disk on which information is recorded in digital format and performs a reproduction processing.

2. Description of the Prior Art

For example, a portable compact disk (CD) player is subject to external shock and shake. In such a case, an optical pickup is largely shifted from a tracing position on the disk, so that the signals are not correctly reproduced. To solve this problem due to shaking, the following method has been proposed:

A digital signal is pre-read from the disk at a speed higher than the reproduction speed to store the digital signal in a memory, and in order to re-read a digital signal read out erroneously, the reading position of the optical pickup is returned to the position on the signal track corresponding to the erroneously read out digital signal, so that the digital signal can be re-read and processed before a data corresponding to the digital signal is read out from the memory. Thereby, the re-reading of the erroneously data can be performed without being delayed from the actual reproduction speed.

According to this method, in FIG. 3, when the pickup jumps from a position B to a position C due to an external shake during reproduction, the pickup is returned to a position A located on the same track as the position B to perform the reproduction over again. Then, the data read out in the re-tracing is compared with a correct data on a track between the positions A and B stored in the memory. When they coincide with each other, the data read out in the re-tracing are stored in the memory from the data on the position B. That is, the data on a track including the position B and the succeeding positions are stored.

In the conventional method described above, however, if the player shakes during the comparison of the data, the data do not coincide with each other and the pickup passes the position B. Since no data on the track succeeding the position B are stored in the memory, the comparison cannot be made after the pickup passes the position B, so that the original object of preventing discontinuity in the sound cannot be achieved.

Moreover, when the data do not coincide with each other for any length of time in the comparison, the consumption of the data stored in the memory advances, and when there is no more data in the memory, the reproduction data obtained by the pickup are forcibly written in the memory to continue the data, so that a quite different data (in an example of FIG. 3, the last data in the memory is a data on a position just in front of the position B, whereas the data reproduced through the optical pickup when the data do not coincide with each other thereby to empty the memory is a data on a position far behind the position B; this data is considerably different from the data on the positions before the position B) follows the last data. As a result, a discontinuity of data is recognized in the reproduced sound.

SUMMARY OF THE INVENTION

An object of the present invention is to provide a disk reproducing apparatus where no discontinuity of data occurs even if the apparatus shakes for a certain period of time.

Another object of the present invention is to provide a disk reproducing apparatus where there is no discontinuity in the reproduced sound even if there is a flaw on the disk.

To achieve the above-mentioned objects, according to the present invention, in a disk reproducing apparatus which writes in a memory a digital signal read out by a pickup from a disk on which an information data is recorded as a digital signal and that reads out the signal written in the memory at a speed lower than a writing speed to perform a reproducing operation, the following are provided: a servo including the pickup; a first comparison buffer for storing therein a reproduced data for a predetermined period of time; a second comparison buffer for storing therein a data on a position just in front of a position where an abnormality of the servo occurs; means for outputting a servo abnormality signal by detecting the abnormality of the servo; means for, when the servo abnormality signal is outputted, returning the servo to a predetermined operation point for the servo to perform a re-try; a coincidence determining circuit which determines whether or not an after-servo-abnormality-occurrence return data stored in the first comparison buffer and the data, stored in the second comparison buffer, on the position just in front of the position where the abnormality of the servo occurs coincide with each other; means for stopping data writing to the memory when the servo abnormality signal is outputted; means for writing in a memory a data on the position where the abnormality occurs and positions subsequent thereto when the data coincide with each other in the determination by the coincidence determining circuit; and re-try controlling means for controlling the re-try of the servo by monitoring the determination of the data coincidence.

According to the present invention, when the optical pickup jumps from the normal tracking position due to an external shake, first, the data writing to the memory is stopped. The servo is returned to a predetermined operation point to re-try the signal reproducing operation by the optical pickup. The data obtained by the re-try replaces the data stored in the first comparison buffer. Whether the data in the first comparison buffer and the data in the second comparison buffer coincide with each other or not is determined by the coincidence determining circuit.

When the data coincide with each other, the data on the position behind the position where the abnormality occurs is written in the memory. When the data do not coincide with each other, the re-try can again be performed by the re-try controlling means. Thereby, it can be avoided that the determination of coincidence becomes impossible due to a shake, etc.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 1:
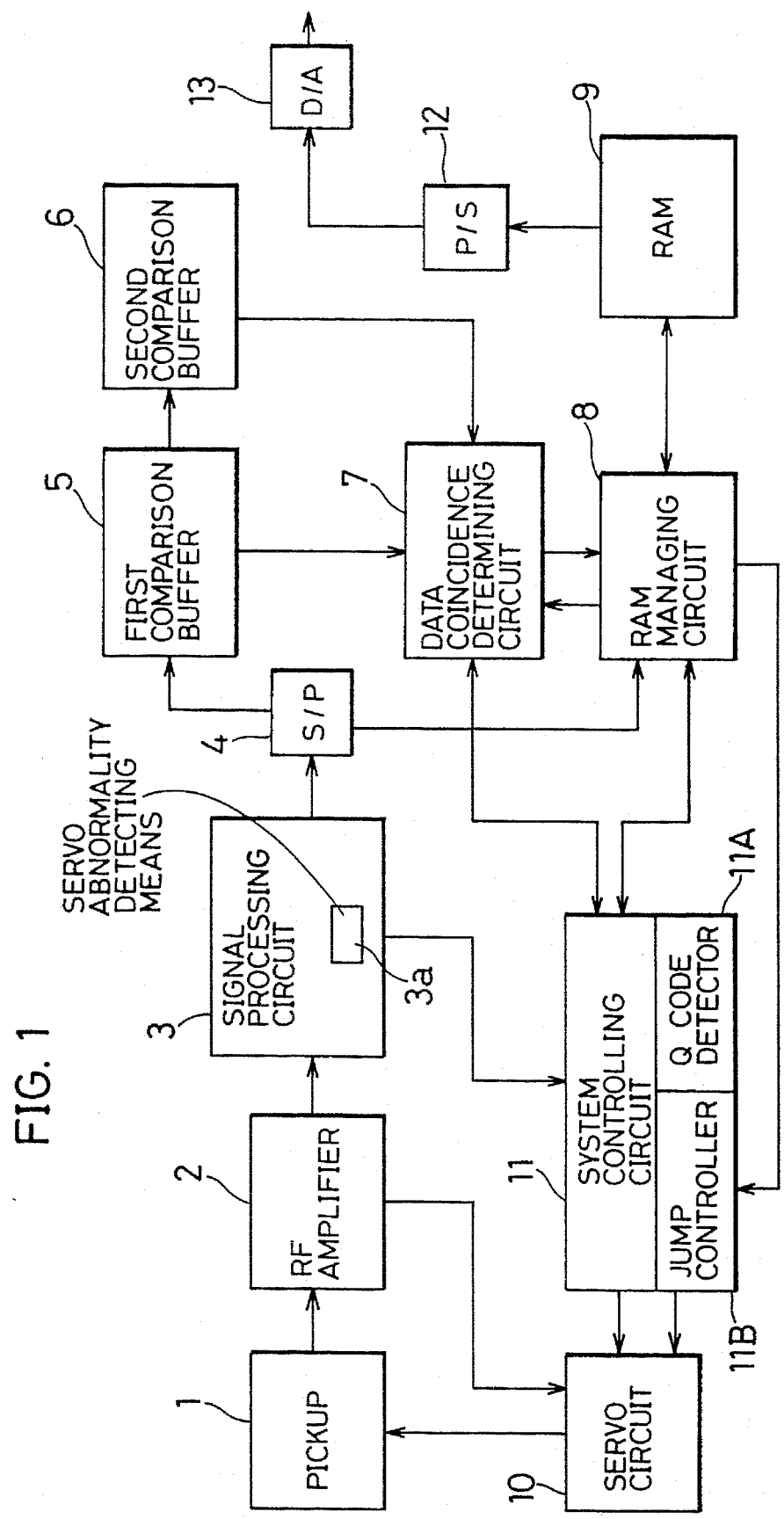
FIG. 1 is a schematic block diagram showing the arrangement of a disk reproducing apparatus according to an embodiment of the present invention.

Referring to FIG. 1, there is shown a block diagram of the arrangement of a disk reproducing apparatus according to an embodiment of the present invention. Reference numeral 1 represents an optical pickup which projects a light beam to a disk on which information data are recorded as digital signals and that detects the light beam reflected by the signal surface of the disk to convert it into an electric signal. During reproduction, the optical pickup 1 moves from the inside to the outside along the diameter of the disk.

Figure 5:
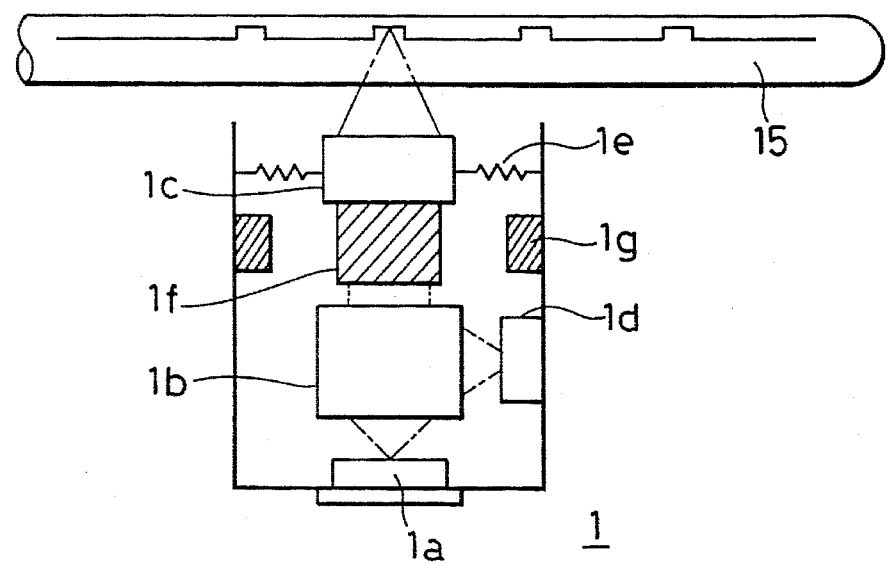
FIG. 5 shows the arrangement of an optical pickup of the embodiment.

The optical pickup 1 is structured as shown in FIG. 5. An infrared ray from a semiconductor laser 1a is irradiated to an objective lens 1c through an optical system 1b including a collimator lens and a beam splitter. When reflected by a compact disk 15, the infrared ray thus irradiated is incident on a photodiode 1d through the objective lens 1c and the optical system 1b, and is detected as a photoelectric current to be transmitted to a radio frequency (RF) amplifier. The objective lens 1c is held by a damper 1e and is provided with an electro-magnetic force in a magnetic field generated by a permanent magnet 1g by conducting a coil 1f. The optical pickup 1 thus structured will not be described in further detail since various types of such pickups have been proposed and they are all known.

Of the elements of the optical pickup 1, a structural portion consisting of the coil 1f, the permanent magnet 1g and the damper 1e constitutes a tracking actuator which is used to cause the objective lens 1c to follow the information track on the compact disk 15 in a minute range. In other words, the portion constitutes a fine adjustment means.

Although not shown, the optical pickup 1 is provided with a traverse motor to convey the structure shown in FIG. 5 in block. The traverse motor constitutes a rough adjustment means for causing the objective lens 1 to roughly follow the information track. As the traverse motor, a voice coil motor may be used, or a rotary motor may be used if its rotary movement is converted into a linear movement by a member such as a worm gear.

Returning to FIG. 1, reference numeral 2 represents an RF amplifier which converts the photoelectric current obtained by the optical pickup 1 into a voltage signal to amplify it. The RF amplifier 2 outputs a signal data. Reference numeral 3 represents a signal processing circuit which processes the signal data (serial digital signal) to demodulate information data and error detecting/correcting data and to detect and correct errors.

The signal data outputted from the signal processing circuit 3 is a serial data. Reference numeral 4 represents a serial-to-parallel converting circuit which converts the serial data into a parallel data. The signal processing circuit 3 is provided with a servo abnormality detecting means 3a for detecting an abnormality of the servo based on the presence/absence of errors in the digital signal. A servo abnormality detection signal from the servo abnormality detecting means 3a is supplied to a subsequently-described system controlling circuit 11.

The information data outputted from the optical pickup 1 includes an error correcting data. When there is an abnormality such that the optical pickup jumps (i.e. the objective lens 1c jumps to another track), an error is caused in the signal due to a remarkable discontinuity of data, so that a C2 flag representing that error correction is impossible is set.

The discontinuity of data is caused in the following two cases: when only the above-described tracking actuator serving as the fine adjustment means is shifted from the regular track; and when the whole of the optical pickup 1 including the traverse motor serving as the rough adjustment means is shifted from the normal track (in this case, naturally, the objective lens 1c is also shifted from the regular track). The C2 flag is set in both cases.

The servo abnormality detecting means 3a monitors the C2 flag and outputs a detection signal representing that there is an abnormality of the servo when the C2 flag is set. The C2 flag itself may be outputted as the abnormality detection signal.

Reference numeral 5 represents a first comparison buffer (register) the contents of which are successively replaced by input parallel data. Reference numeral 6 represents a second comparison buffer (register). When the optical pickup 1 is shifted by a shake to skip some signals, the second comparison buffer holds the data on a position just in front of the position where the pickup 1 is shifted. Reference numeral 7 represents a data coincidence determining circuit which determines whether the data of the first and second comparison buffers coincide with each other. The first and second comparison buffers 5 and 6 and the data coincidence determining circuit 7 operate in accordance with a command from the system controlling circuit 11 when there is an abnormality of the servo. They do not operate when there is no abnormality.

The output of the serial-to-parallel converting circuit 4 is separately stored in a random access memory (RAM) 9 through a RAM managing circuit 8. While the writing speed of the RAM 9 is high, its reading speed is set so that the audio data is read out at the same frequency as the sampling frequency at which the audio data is recorded onto the disk.

The output of the RAM 9, which is a parallel data, is converted into a serial data by a parallel-to-serial converting circuit 12 and further converted into an analog signal by a digital-to-analog (D/A) converter 13. Then, the output is supplied to a speaker (not shown) through an audio circuit (not shown). Reference numeral 11 represents the system controlling circuit which controls a disk reproducing method, various searching methods, a focusing pull in method of the optical pick up 1 and an operation of the CD player.

The system controlling circuit 11 includes a Q code detector 11A which detects a Q-channel data (Q code) included in a Sub code signal outputted from the signal processing circuit 3. The Q code includes information representative of the absolute address of the reading position of the optical pickup 1. The system controlling circuit 11 also includes a jump controller 11B which supplies a servo circuit 10 with a track jump signal to displace the reading position of the optical pickup 1 along the diameter of the disk. Normally, there is a discontinuity in the Q code when the C2 flag is set and this may be used to detect the abnormality of the servo.

In this embodiment, the jump controller 11B also produces a signal to cause the optical pickup 1 to jump rearward on the same track. The jump signal is produced when the servo abnormality detection signal is supplied from the servo abnormality detecting means 3a of the signal processing circuit 3. In this case, the following two methods are available: to move only the tracking actuator; and to move the whole of the pickup 1 including the traverse motor. Which method is used is determined based on the distance which the optical pickup is caused to jump.

The servo circuit 10 performs the jump control as well as the control of focusing of the optical pick up 1 based on the signal supplied from the RF amplifier 2, the tracking control by using the tracking actuator and the control of transmission of the optical pickup 1 along the diameter of the disk by using the traverse motor. The RAM managing circuit 8 controls a writing timing and a reading timing of the digital signal of the RAM 9.

Since the writing to the RAM 9 is performed at a speed higher than the reading speed, when the data is likely to overflow, the track jump signal is produced and supplied to the system controlling circuit 11. When the system controlling circuit 11 receives the track jump signal, the jump controller 11B supplies the track jump signal to the servo circuit 10 to return the optical pickup 1 to the predetermined previous position.

Moreover, as mentioned above, when the servo abnormality detection signal is supplied from the servo abnormality detecting means 3a of the signal processing circuit 3 to the system controlling circuit 11, the jump signal is supplied from the jump controller 11B of the system controller 1 to the servo circuit 10, so that the servo circuit 10 causes the optical pickup 1 to jump to the position A. In this case, either the method to move only the tracking actuator or the method to move the whole of the pickup 1 including the traverse motor is used according to the distance which the pickup 1 is caused to jump.

Then, an operation command is supplied from the system controlling circuit 11 to the first and second comparison buffers 5 and 6 and a determination start signal is supplied to the data coincidence determining circuit 7. In synchronism with the recognition of an abnormality of the servo, a command to stop the writing to the RAM 9 is supplied from the system controller 11 to the RAM managing circuit 8.

Subsequently, a case where the optical pickup 1 jumps during reproduction due to external load resistance or shake (i.e. a case where since the objective lens 1c is shifted from the normal track to another track, it is necessary to move the tracking actuator or the whole of the pickup 1 including the traverse motor) will be described with reference to the flowchart of FIG. 2. When the optical pickup 1 jumps, for example, from the position B to the position C of FIG. 3, there is a discontinuity in the Q code or the C2 flag is outputted, so that a detection signal representing that there is an abnormality of the servo is outputted from the servo abnormality detecting means 3a of the signal processing circuit 3.

The system controlling circuit 11 determines whether there is an abnormality of the servo based on the presence/absence of the detection signal at step #5. When there is an abnormality, the Q code on a position just in front of the position where the abnormality occurs is stored (step #10) and the data on the position just in front of the position where the abnormality occurs is stored in the second comparison buffer 6 (step #15). Then, the RAM managing circuit 8 is controlled to stop the data writing to the RAM 9 (step #20).

The system controlling circuit 11 resets and starts a timer provided in the circuit 11 itself (step #25), and outputs a jump control signal at step #35 and commands the data coincidence determining circuit 7 to determine the coincidence of the data at step #40. Then, the circuit 11 determines whether the data coincide with each other or not based on a signal supplied from the data coincidence determining circuit 7 (step #45), and when the data coincide with each other, the data on the position next to the position of the Q code (stored Q code) and positions subsequent thereto are written in the RAM 9.

Figure 3:
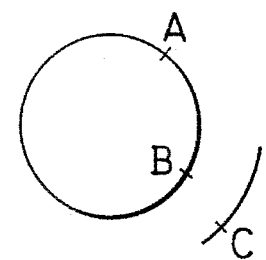
FIG. 3 is a first view of assistance in explaining the embodiment.

When it is determined at step #45 that the data do not coincide with each other, the process proceeds to step #50 to determine whether the pickup 1 have passed the position of the Q code. In the example of FIG. 3, the position of the Q code corresponds to a position just in front of the position B where the pickup 1 is caused to jump. When the pickup 1 has passed the position B, since no data thereon are stored in the second comparison buffer 6, the data (in this case, the data on the position B and positions subsequent thereto) in the first comparison buffer 5 do not coincide with the data (the data on the position just in front of the position B and preceding positions) in the second comparison buffer 6 in the determination.

Therefore, when the pickup 1 has passed the position of the Q code, whether a predetermined period of time $T_O$ has elapsed or not is determined based on the timer at step #55. When the time $T_O$ has not elapsed, the process returns to step #35, where the above-described jump control is performed to return the optical pickup 1 again to the position A.

Consequently, the determination command is supplied (step #40) to perform the data coincidence determination again (step #45). When it is determined at step #50 that the pickup 1 has not passed the position (position B) of the Q code, the process returns to step #45 to perform the coincidence determination. When it is determined at step #55 that the predetermined period of time $T_O$ has elapsed, a forcible return signal is outputted so that the data on the position B and the positions subsequent thereto are written in the RAM 9.

Figure 4:
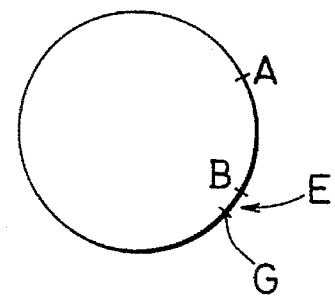
FIG. 4 is a second view of assistance in explaining the embodiment.

As shown in FIG. 4, the forcible return control is effective when there is a flaw E on the disk at a position behind the position B. That is, the data do not coincide when there is a flaw and the process repeatedly returns to the position A to repeat the above-described operation, so that the consumption of the data stored in the RAM advances as the time elapses and the RAM 9 is emptied.

Therefore, in such a case, before the RAM 9 is emptied, the data on the positions succeeding a position G (a position at which the flaw ends) are written to RAM 9 continuously from the data (data previously stored in the RAM 9) on the position just in front of the position B and preceding positions. The data on the position just in front of the position B and the data on the position G are alike and no discontinuity is caused between these data. With this arrangement, the data continues as if there were no flaw and sound discontinuity hardly occurs.

Figure 2:
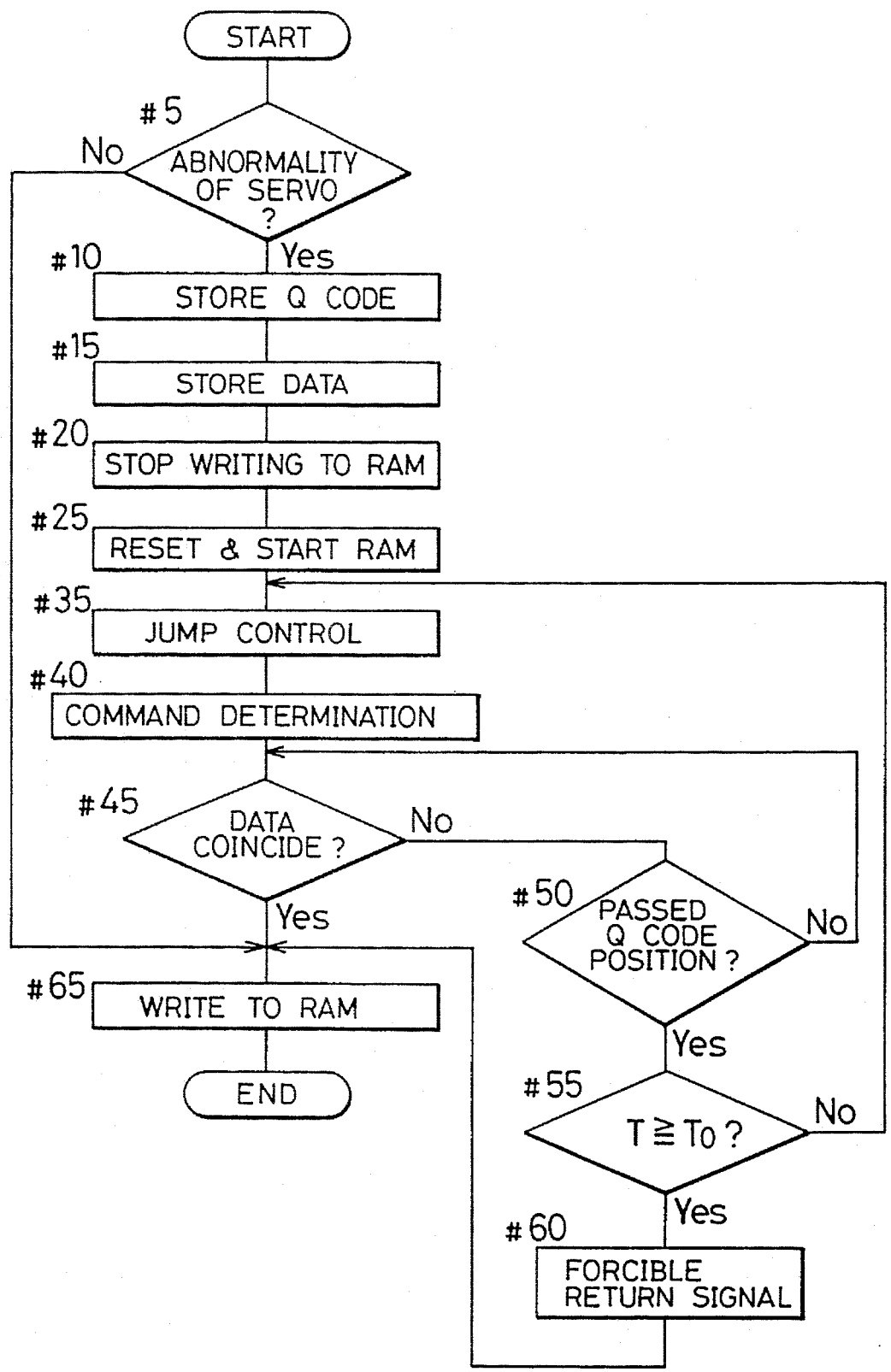
FIG. 2 is a flowchart of an operation in the embodiment.

While the time limit of the forcible return control is controlled by a timer in the flowchart of FIG. 2, instead of controlling by the timer, the forcible return may be performed when the amount of remaining data in the RAM 9 whose information is received by the system controller 11 from the RAM managing circuit 8 becomes a predetermined amount (e.g. one-half the capacity of the RAM 9).

As described above, according to the present invention, when the data do not coincide with each other, by performing re-try, for example, by repeating the process by the re-try controlling means, the data coincide with each other even if the reproducing apparatus continues to shake for a certain period of time, so that it is avoided that the memory is emptied. As a result, the discontinuity of the data is prevented.

In addition, even when the data do not coincide due to a flaw on the disk, the signal processing is performed as if there were no flaw, so that the occurrence of sound discontinuity due to the flaw can be prevented as much as possible.

Obviously, many modifications and variations of the present invention are possible in light of the above teachings. It is therefore to be understood that within the scope of the appended claims, the invention may be practiced other than as specifically described.

What is claimed is:

1. A disk reproducing apparatus which writes in a memory a digital signal read out by a pickup from a disk on which an information data is recorded as a digital signal and that reads out the signal written in the memory at a speed lower than a writing speed to perform a reproduction operation comprising:

servo means including the pickup;

a first comparison buffer for storing therein a reproduced data for a predetermined period of time;

a second comparison buffer for storing therein a data on a position just in front of a position where an abnormality of the servo means occurs;

means for outputting a servo abnormality signal by detecting the abnormality of the servo means;

means for, when the servo abnormality signal is outputted, returning the servo means to a predetermined operation point for the servo means to perform a re-try so that the data of the disk is reproduced as a re-tried data;

a coincidence determining circuit which determines whether or not the re-tried data stored in the first comparison buffer and the data stored in the second comparison buffer coincide with each other;

means for stopping data writing to the memory when the servo abnormality signal is outputted;

means for writing in the memory a data on the position where the abnormality occurs and positions subsequent thereto when the data coincide with each other in the determination by the coincidence determining circuit; and re-try controlling means for controlling the re-try of the servo means by monitoring the determination of the data coincidence.

2. A disk reproducing apparatus according to claim 1, wherein said re-try controlling means causes the servo means to repeat the re-try for a predetermined period of time when the data do not coincide with each other after the pickup has passed a reading position, on the disk, of the data on the position just in front of the position where the abnormality of the servo means occurs.

3. A disk reproducing apparatus according to claim 1, wherein when the data do not coincide with each other even if the re-try of the servo means is repeated for a predetermined period of time, the retried data is forcibly written in the memory continuously from the data on the position just in front of the position where the abnormality of the servo means occurs.

4. A disk reproducing apparatus according to claim 1, wherein said pickup reads out the information data from an information track formed on the disk by an optical means.

5. A disk reproducing apparatus according to claim 1, wherein said pickup comprising:

fine adjustment means movable along a diameter of the disk in a minute range; and rough adjustment means for making the fine adjustment means movable along the diameter in a rough range, wherein said servo means controls the fine adjustment means and the rough adjustment means.

6. A disk reproducing apparatus according to claim 5, wherein said servo abnormality signal is outputted when the fine adjustment means is abnormally away from the information track, said servo abnormality signal depending on a flag.

7. A disk reproducing apparatus according to claim 5, wherein said servo abnormality signal is outputted when the fine adjustment means and the rough adjustment means are both abnormally away from the information track, said servo abnormality signal depending on a flag.

8. A disk reproducing apparatus according to claim 1, wherein said first comparison buffer and said second comparison buffer each comprise a register.

9. A disk reproducing apparatus according to claim 1, wherein said predetermined operation point is represented by a code included in the information data.

10. A disk reproducing apparatus according to claim 9, wherein said servo abnormality signal is detected by a discontinuity of the code.

* * * * *